Figure 1:
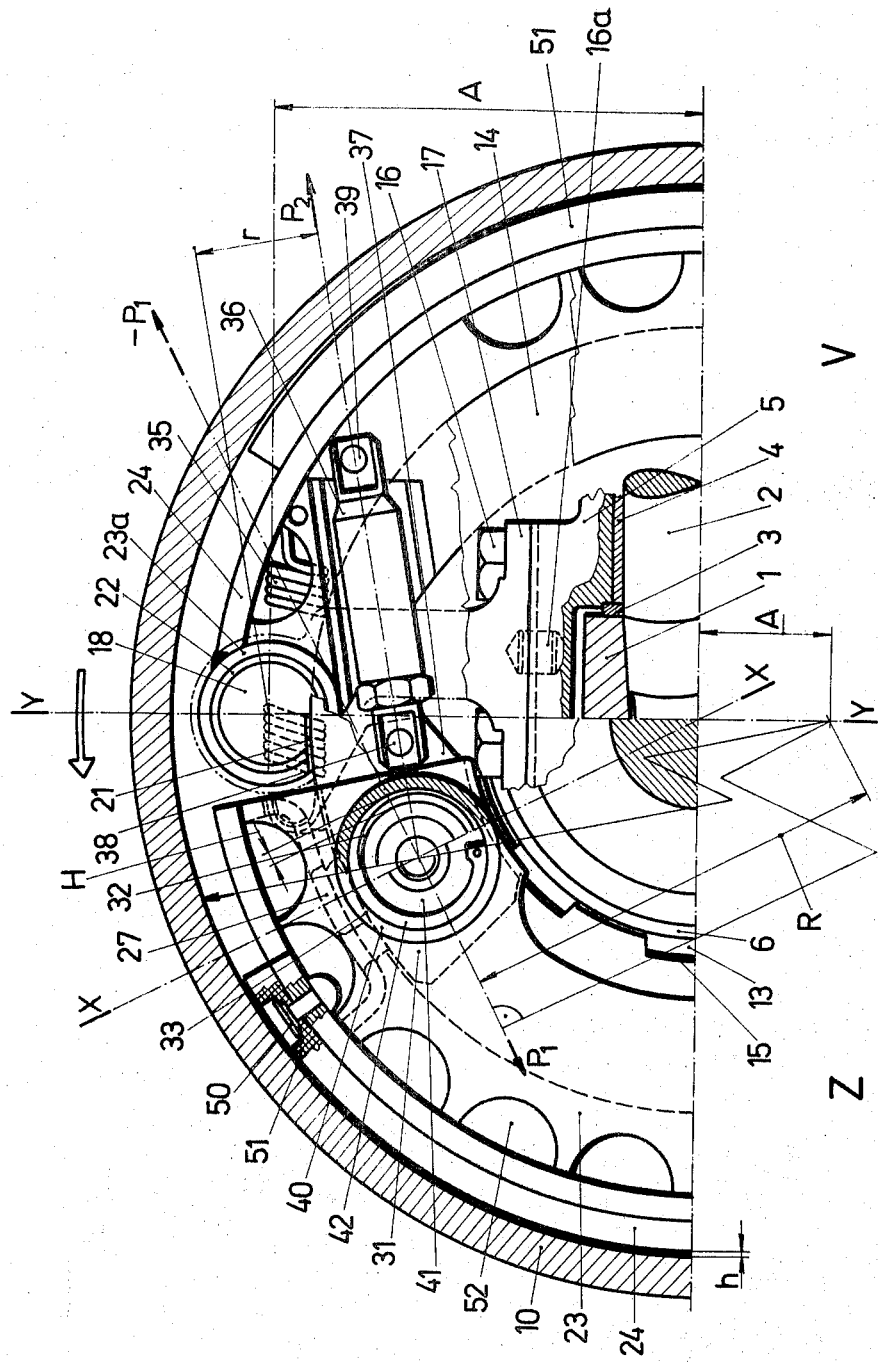

United States Patent

Székely

[11] 3,844,385
[45] Oct. 29, 1974

[54] BRAKE MECHANISM FOR MOTOR VEHICLES

[75] Inventor: László Székely, Budapest, Hungary

[73] Assignee: Autoipari Kutato Intezet, Budapest, Hungary

[22] Filed: May 11, 1973

[21] Appl. No.: 359,761

[30] Foreign Application Priority Data
May 17, 1972  Hungary ............................. AU 274

[52] U.S. Cl. ..................... 188/70 B, 192/35, 192/65
[51] Int. Cl. ............................................. F16d 63/00
[58] Field of Search ............... 188/70 B; 192/35, 65

[56] References Cited
UNITED STATES PATENTS

| | | | |
|---|---|---|---|
| 2,609,902 | 9/1952 | Stripling | 192/35 |
| 2,629,473 | 2/1953 | Vincent | 192/35 X |
| 2,871,990 | 2/1959 | Burnett | 188/70 B |
| 2,942,694 | 6/1960 | Burnett | 188/70 B |

FOREIGN PATENTS OR APPLICATIONS 767,706   2/1957   Great Britain ................... 188/70 B

*Primary Examiner*—George E. A. Halvosa
*Attorney, Agent, or Firm*—Young & Thompson

[57] ABSTRACT

A motor vehicle brake comprises in combination a drum brake and a disc brake. The disc brake has a brake caliper which is pivotally mounted to turn, under the reaction of the disc brake, into a position to apply the drum brake. It is thus possible to distribute the braking reaction and to reduce the magnitude of the brake-applying forces, thereby also decreasing the braking surface area requirement and increasing the life of the friction linings.

2 Claims, 4 Drawing Figures

BRAKE MECHANISM FOR MOTOR VEHICLES

The invention concerns improvements in a wheel or gear brake, particularly for motor vehicles, comprising a novel combination of a drum brake with inner shoes and a disc brake, wherein a brake drum and a brake disc secured to the mechanism or transmission part (wheel hub, axle) to be braked are so arranged relative to each other that a brake caliper constituting a part of the disc brake is, when braking, forced to rotate about a bolt - which is expediently common with one or the other brake shoe - by means of an actuating force due to the frictional force generated by brake pads journalled at this brake caliper and being supported by one or the other brake shoe, presses the latter against the active inner mantle surface of the brake drum, whereby both at the disc brake and at the drum brake a braking effect arises and so the braking output is distributed and the possibility is afforded of reducing the magnitude of the actuating forces or of the brake dimensions; or, because of the lower and better distributed specific brake surface area requirements, of increasing the life of the friction linings.

Combinations of braking devices are known comprising a shoe brake operated by the reaction forces being generated on the friction surfaces of a disc brake. The transmission of these forces is realized in the known solutions by means of different mechanisms all of complicated structure. In some of these known combined braking devices the braking effect is the sum of the both effects deriving from the devices being combined but only in one direction of rotation, and in the other direction one of the combined devices does not act. In other known devices, to ensure effectiveness in both directions of rotation, the brake shoes or only the acting friction surfaces thereof are divided for the two different purposes, and as a consequence the lining surface areas of the shoes are limited, and this causes extensive wear of them.

The present invention provides, in essence, an expedient and advantageous solution for the construction and actuation of an inner shoe drum brake in actuating association with a caliper-type disc brake forming together a composite braking device, according to which inside the drum brake pads guided in brake calipers serve to brake disc rotation between the webs of the brakeshoes are pressed by an external force against both of the opposite sides of the brake disc. The reaction forces to the generated friction forces at the pads press the brakeshoes against the active inner surface of the brake drum since the brake pads according to the invention pivot independently from the brakeshoes.

The independent movability of the brake pads derives from their special suspension. When the calipers are fixed on the end of the shoes forming together a one-piece braking means, the pads are conducted in their calipers tangentially with a gap that causes a backlash allowing - with regard to the direct actuation of the supporting shoe when rotating in forward drive - the other shoe to be actuated, when it rotates in reverse, by means of automatically operated adjusting devices which are the pads and these shoes interconnected by them, permitting the shoes to move according to the backlash in an opposite sense, urged by the forces transmitted from the pads of the neighboring shoes.

When the calipers are independently suspended about the anchoring means in common with the brake shoes, the torque of the frictional forces urges the calipers comprising the pads to pivot around their anchoring means which are, however, prevented by the neighboring brakeshoe since the latter abuts on the calipers with its suitably formed end, and transmits the reaction forces to the active surface of the brake drum.

The independent movability of the brake pads upon reverse rotation is similarly utilized to actuate the shoes with which they are commonly suspended. As a consequence of the structural arrangement according to the invention, the ratio of the shoe forces exerted on the drum to the tangential forces exerted on the brake pads by friction against the brake disc can be held near to the maximum theoretically and practically possible. It follows from the arrangement that the brake shoes are expediently both self-energizing when the brake drum is rotating in the forward drive of the vehicle. Actuation of the disc brake may ensue manually via known and usual transmission mechanisms (rod linkage, Bowden cables etc.) or also by means auxiliary power sources supplying known mechanisms (rams).

A further advantage of the design according to the invention consists additionally in that, in contrast to the known constructions, the reduction in the braking effect resulting from a change in the direction of rotation arises in a fraction only of the total braking effect, since the braking effect of the disc brake is the same in both senses of rotation. Similar advantages arise also in respect of bringing the vehicle to a standstill or decelerating it, when on a slope, which in general ensue through manual force, both because of the smaller power requirement and of the independence of the braking effect of the disc brake of the direction of rotation.

A decisively great advantage of the constructional design according to the invention consists in that with the usual brake drum dimensions, considerably smaller specific area loads on the friction linings, drum and disc surfaces can be achieved than usual, whereby additionally a favourable change is experienced in the distribution of the amount of heat, which is proportional to the braking force, and in the magnitude of the heat-conducting masses and the heat-emitting surfaces. All this together has the consequence of an increase in braking efficiency, constancy in the braking effect as well as a significantly increased service life of the brake, which is of great importance in the operation, and keeping in operation, of motor vehicles.

A further advange of the construction according to the invention is that consequent on the wear of the friction linings at the brake shoes - especially in the case of the case of thick linings - the necessary compensation for the abrasion and regulation of the brake clearance can be achieved, in addition to a simple automatability, such that by rotation of the wheel in the opposite sense (e.g. reverse drive), in addition to the braking by the disc trailing shoe braking can also be exploited in the following way: with a known automatic adjusting mechanism, which yields to tension but is capable on compression (after a predetermined lost motion), of transmitting forces, the brake pad supported in one brake shoe with tangential play or the independent brake caliper can be pivotally connected with the other brake shoe such that the tangential frictional forces generated in the brake pad or stirrup press the trailing brake shoe, by the intermediation of the adjusting mechanism which is rigid in this condition, around its anchoring means towards the active surface of the brake drum and engages the latter.

The constructional embodiment according to the invention affords the possibility of compressed air actuation of the disc brake working in general at a lower operational pressure and consequently, with regard to its size, requiring a smaller mechanism.

This possibility arises because the power requirement of the combination according to the invention is low and similarly the required stroke is proportional to the relatively low admissible wear of the brake block friction linings. In practice, the low actuation power requirement makes it possible rigidly to secure the power source to a non-rotating part of the gear or running mechanism and to transmit the power to the brake blocks via a lever arm - which is also supported by the pivoting brake stirrup - while the absorption of the reaction to the external actuation force, relative to the brake stirrup, is ensured by the journalling of the brake stirrup. Such a constructional embodiment at the same time affords the possibility of using further auxiliary power which is held or stored in a potential state and is compensated by the auxiliary operating power source, and of using it as a second safety braking system under considerably more favourable conditions and circumstances than hitherto, viz. by using, in the known manner, a spring pretensioned by compressed air, whereby the system is smaller, better accommodatable in the available space and cheaper because of the smaller disc brake actuation power requirements.

The brake construction according to the invention is particularly expedient and advantageous for motor vehicles with large brake power requirements, e.g. high speed or large axle load motor vehicles, further in urban buses, or in areas of use where the size of the actuation mechanism hinders the realization of other demands, thus e.g. for steered front wheels provided with a compressed air brake apparatus, a correspondingly large wheel rotation.

Figure 2:
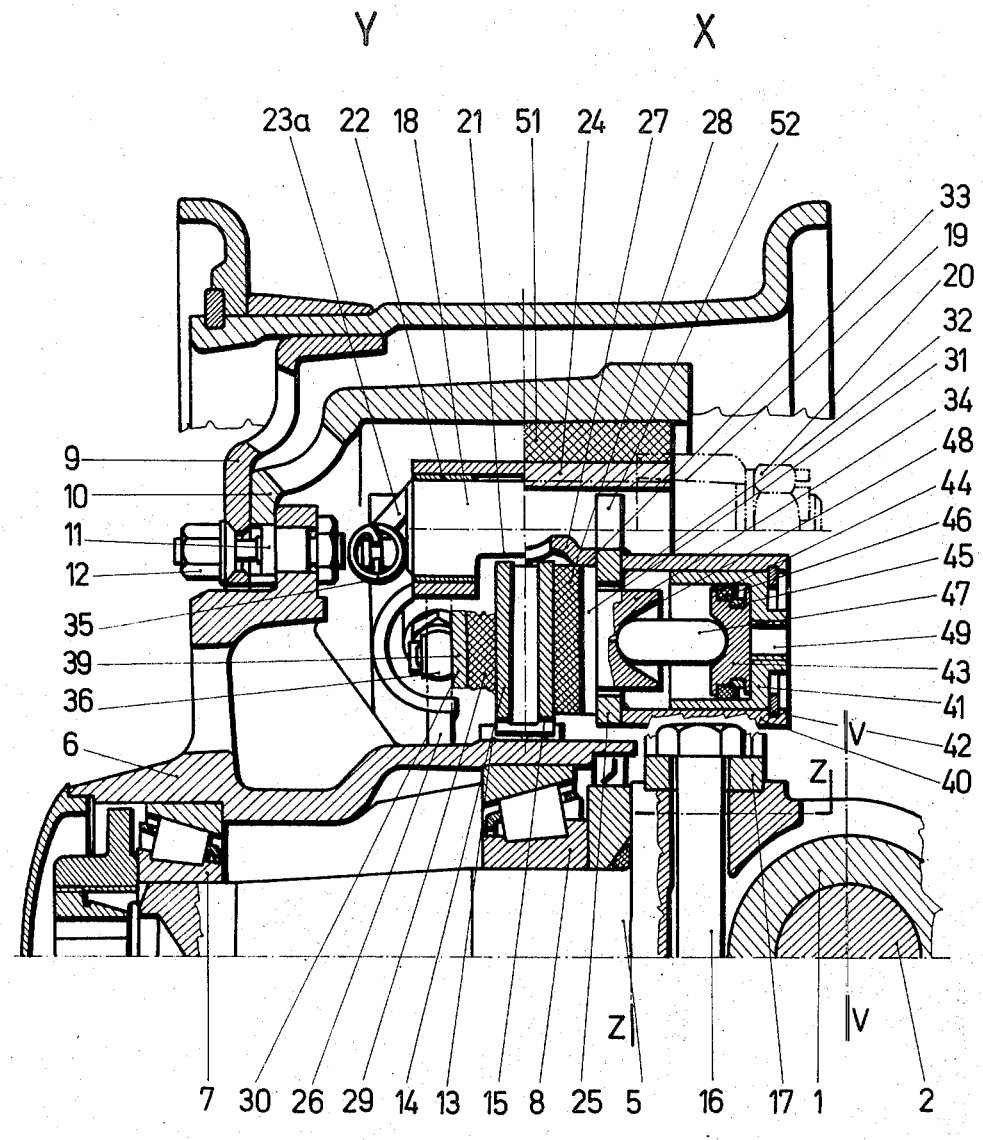
Figure 3:
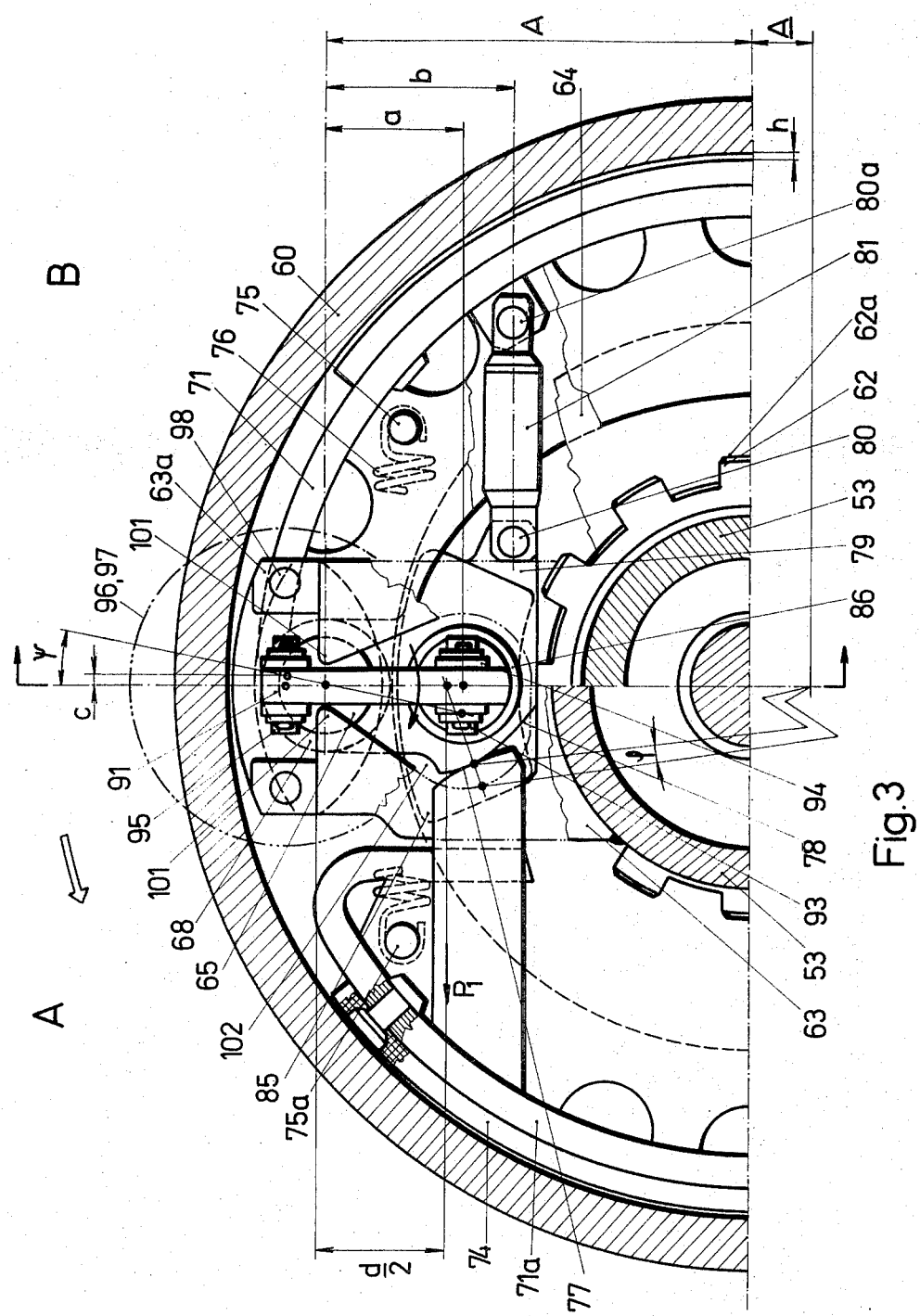
Figure 4:
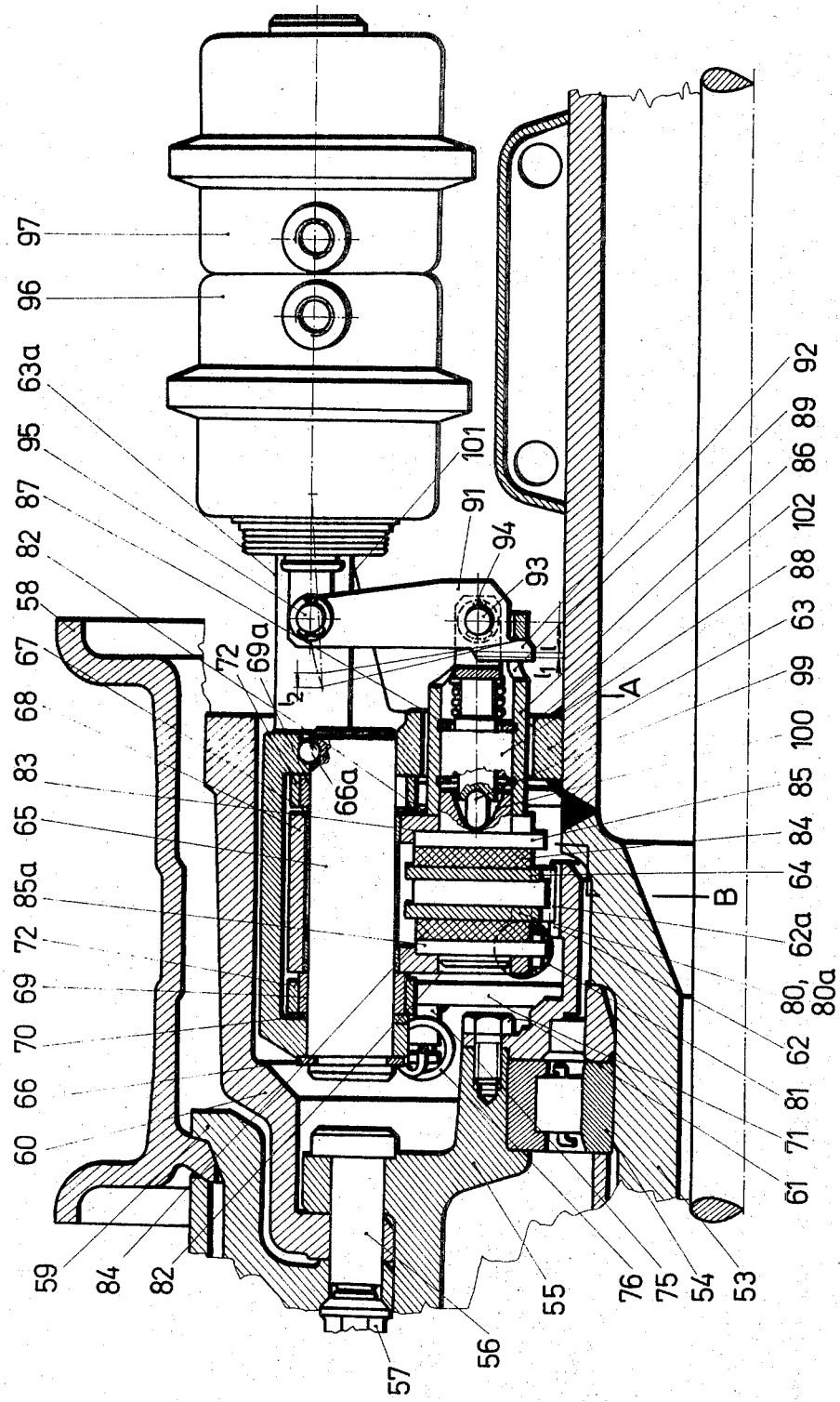

The invention will be described in the following with reference to certain examples of embodiment with the aid of the drawings. In the drawings:

FIG. 1, part Z (left-hand side) is a section along line Z—Z in FIG. 2;
   part V (right-hand side) is a section along line V—V of FIG. 2, in a first preferred embodiment wherein the arrow represents the direction of rotation in forward travel;

FIG. 2, part Y (left-hand side) is a section along line Y—Y in FIG. 1;
   part X (right-hand side) is a section along line X—X in FIG. 1;

FIG. 3, part A (left-hand side) is a section along line A in FIG. 4 of a modified form of the invention;
   part B (right-hand side) is a section along line B in FIG. 4, and FIG. 4 is a longitudinal section through the embodiment of FIG. 3.

FIG. 1 shows the arrangement of the brake shoes, while FIG. 2 in the above given sections shows the spatial arrangement of the components for e.g. a steered wheel, for a hydraulically actuated combined brake apparatus.

In one end piece 1 of a non-illustrated shaft a steering swivel pin 2 is secured and a sterring shank 5 is rotatably journalled on it and a bearing bush 4. A wheel hub 6 is journalled in conical roller bearings 7 and 8 of the steering shank and a wheel disc 9 as well as a brake drum 10 are secured to the wheel hub 6 by means of wheel bolts 11 and wheel nuts 12. At the wheel hub 6 ribs 13 are provided on which a wheel disc 14 is mounted axially displaceably but rotatably with the hub by virtue of grooves 15 engaging the ribs 13. A brake holder or carrier 17 is secured to the shank 5 by means of screws 16 and a securing dowel 16a, in which carrier a brake shoe bolt 18 as an anchoring means is secured with a conical seat 19 and a nut 20. In the bolt 18 there is a cut-out 21 so as to enable brake discs of the largest possible diameter to be used. Around this bolt located at a distance A from the centre line of the brake drum, and around another, non-illustrated bolt arranged in a mirror-symmetrical fashion relative to the first-mentioned bolt and thus also located at a distance A from the axis of rotation, brake shoes 23 and 23a are mounted by way of bushes 22, the feet 24 and backs or webs 25 and 26 of the shoes being constructed, together with a stiffening insert 27, as a brake caliper and serving for the reception of brake pads 30 and 31 provided with friction linings 28, 29 and serving also for fitting the pads in an opening 32 and to support them against rotation along an external curve 33. At the opening 32 a stem 34 of the brake pad 31 is mounted tangentially with respect to the centre to the caliper with a clearance H.

The brake shoes are pulled together by a spring 35 and are simultaneously urged apart by a per se known automatic adjustment member 36 which yields to tension but can transmit compressive forces without changing its length and which possesses lost motion, such that one end of the adjustment member 36 is pivotally connected to a lug 37 of the brake pad 31 fitted in one of the brake shoes and the other end is pivotally connected to the other brake shoe by way of pins 38 and 39. In a side sleeve 40 of the webs or backs of the brake shoes a hydraulic jack 41 is mounted and with the aid of a securing ring 42 is supported in one axial direction. A piston 43 is provided with a sealing ring 44 and an automatic adjustment mechanism comprising a disc spring 46 pretensioned by a ring 45 and operating in a manner known per se, and at the same time the piston is also connected with the brake pad 31 by way of a pressure rod 47 which is supported in a hollow space 48 in the pad. A bore 49 serves for introducing the pressure medium.

Friction linings 51 are secured in the usual manner to the brake shoes by rivets 50 which in the released position of the brakes are spaced by a distance or play $h$ from the active inner mantle surface of the brake drum. The openings 52 in the back or web of the brake shoes serve to ventilate the disc brake construction.

The mode of operation of the above apparatus may be described as follows. When, in order to brake, a pressure is created in the working cylinder 41, which is connected to a hydraulic actuator via a non-illustrated, conventional, flexible tube coupled to the tapped bore 49, the pressure displaces the piston 43 and causes, via pressure rod 47, the brake pad 31 and friction lining 28 to press against the brake disc 14, whereby the disc is displaced until it abuts against the friction lining 29 of the brake block 30, or against the brake pad itself, while the latter abuts the back or web 26 of the brake shoe, and engages it with the force supplied by the brake cylinder. The force "flow" path is closed at the outside of the bottom of the working cylinder 41 via the foot 24 of the brake shoe or the stiffening insert 27, the other back or web 25, the side sleeve 40 and the securing ring 42.

The clamped brake disc, rotated by the wheel to be braked, entrains the brake shoes which clampingly hold it so that they are forced to turn about their bolts until the pre-adjusted brake play $h$ disappears. Then, in accordance with the direction and magnitude of the tangential friction force $P_1$, arising at the brake disc and exerted as a torque through the moment arm R, the brake shoes are pressed against the inner mantle surface of the brake drum and generate a friction force with the reaction force arising there. The force balance of the brake shoe is adjusted by the reaction force arising at the brake shoe bolt.

On braking, between the brake disc and the friction linings of the brake pads there arises a circumferential force in accordance with the speed of rotation of the disc. The movement of all points covered by the brake pads on the brake shoes, which occurs until the disappearance of the brake play and thereafter during wear of the friction linings, can be resolved into radial and tangential components. The latter coincide with the movement of the brake disc, while the radial components do not give rise to friction, since they are normal to the circumferential velocity; consequently disc friction does not reduce the engagement force between the brake shoes and the brake drum.

The automatic adjusting member keeps the brake shoes apart against the force of the spring and freely yields to braking movement and wear of the friction linings; when the direction of rotation changes from that shown in the drawing (e.g. when the motor car reverses), it becomes rigid against compression and transmits a force $-P_1$ of opposite sense from the brake block 30 to the other brake shoe 23a, which in this condition is a trailing shoe, and presses the latter against the active surface of the brake drum. This is possible because the support clearance H is greater than the sum of magnitude of the brake play $h$ measured on both brake shoes in the direction of displacement, which play $h$ is always automatically preadjusted. Thus it becomes possible for the brake shoe 23 to be forcibly displaced in one direction by the mirror-symmetry structure without abutment, and simultaneously its brake block will move to the necessary extent in the opposite direction. Having regard to the small values in practice, the thus arising axial deviation (non-alignment) between the brake cylinder and the brake pad is bridged over by the oblique disposition of the transmission rod 47.

The braking effect in the operational condition with a sense of rotation opposite to that shown is provided by the brake disc friction of unchanged magnitude and additionally, by twice (due to the symmetry) the magnitude of the sum of the friction forces generated by the reaction at the active surface of the brake drum, the reaction arising from the component $P_2$ of force $-P_1$ (shown in dotted lines) exerting a torque through the moment arm $r$ and brake shoe 23a. Through an expedient arrangement it can then be achieved that the component of the force $-P_1$ perpendicular to $P_2$ should not rotate the brake shoe 23, or to rotate it in a favourable direction, depending on where its line of action falls in relation to the axis of rotation of the brake shoe.

The wear of the friction linings 28 and 29 of the disc brake is compensated in a manner known per se by the sealing ring 44 of the piston 43 and the disc spring 46, such that in the course of the active stroke of the piston under the effect of the high pressure of the medium the sealing ring forcibly pressed against the wall of the cylinder is deformed by the movement of the piston and the disc spring 46 is also defomed, at most to an extent corresponding to the width of the ring 45, to a conical shape, and then in this state the assembly is entrained for further movement by the piston. If its stroke becomes greater than the play (e.g. because of wear of the friction linings), when the pressure of the medium is released the disc spring returns to its minimally pretensioned state and pulls the piston back by an amount corresponding to its deformation, since the pretensioning of the sealing ring ensures a sufficiently great friction coupling with the wall of the cylinder and also with regard to the piston force arising from the residual pressure in the system.

FIGS. 3 and 4 show another example of the construction according to the invention in side view and in section, respectively, and in both Figs. only one half is shown because of the symmetry.

A wheel hub 55 is mounted by bearings 54 on a bridge 53 and has secured to it by wheel bolts 56 and wheel nut 57 one member, designated by 58, of twin wheels supported by a wheel hub disc 59 and a brake drum 60; further a ribbed sleeve 62 is secured to the hub by bolts 61 and a brake holder 63 is rigidly connected to the bridge (e.g. by welding). A brake disc 64 provided with grooves 62a is fixed to the disc 64 so as to be free in the axial direction. A pivot bolt 65 is fastened to the brake holder 63 and is secured against axial movement as well as rotation by a securing ring 66 and a ball 66a, respectively. A brake caliper 68 is journalled on the pivot bolt 67 by bushes and the caliper is located in the axial direction by sleeves 69, 69a and a shoulder ring 70. Rotatably mounted on the sleeve are the lugs of the brake shoes, i.e. 72 of brake shoe 71 and the non-illustrated lugs of brake shoe 71a arranged symmetrically. Friction linings 74 are mounted on the brake shoe by rivets 73, the friction linings being at a clearance $h$ from the active inner mantle surface of the brake drum in the non-braked condition. A spring 76 is mounted on pins 75 and 75a of the brake shoes 71, 71a. At the end of the brake shoes a supporting surface 77 is formed while on the brake caliper 78 there is a counter-surface and an extension 79 in which a ball is formed for the bolt 80. The supporting surface 77 and the counter-surface 78 are expediently involute-shaped in profile, the centre of the base circle of the profile lying on the centre lines of the bolts. The bolt spacing from the axis of the brake drum is A in both directions. Regarding the profiles of the involutes as tooth flanks, the radii of the pitch circle are, relative to the teeth on the stirrup, $d/2$ and relative to the brake shoe, $(2A - d/2)$. A bolt 80a is fixed in the brake shoe 71 and a per se known automatic adjustment member 81 is pivotally secured at its ends to the bolts 80 and 80a; the member yields to tensile forces and under the effect of compression is capable of transmitting forces without changing its length, after moving by a preadjusted play.

Bores 82 and shoulders 83 are formed in the brake caliper, and brake pads 85 and 85a provided with friction linings 84 fitting into the bores and shoulders so as to be displaceable in the direction of the axis of the bores but are prevented from rotation, and further they engage opposite sides of the brake disc 64. A side sleeve 86 is rigidly secured to the brake caliper 68 at a distance a from the bolt into which sleeve the housing of an automatic adjusting member 88 of per se known construction is secured with securing rings 87; the housing is axially supported in both directions and is provided with a cut-out 89. The adjusting member 88 is capable of transmitting forces when compressed, after taking up play of preadjusted magnitude, and when one of its ends is pulled back, the distance between its ends is automatically increased in accordance with the wear of the friction linings and the brake disc while maintaining the desired brake clearance. In the cut-out one end 92 of a one-armed lever 91 is supported to which lever the forked end 94 of the automatic adjusting member is coupled in an articulated manner by way of a further bolt 93. Furthermore, the lever is connected to the forked end of a piston rod via a bolt 95, the piston rod being associated with a membrane or pistontype power source 96 of per se known construction operating with compressed air, the piston rod being such as to permit spatial angular deviation; and the force-transmitting part of a power source 97 is indirectly pivotally connected to the piston rod in known manner, the power source 97 being of the kind which stores spring force compensated by compressed air.

The two power sources are secured to the extension 63a of the brake holder 63 by non-illustrated screws passing through bores 98 and forming part of the working cylinder. The adjustment member 88 is supported by way of a connecting rod 99 on the bottom of a hollow extension 100 of brake pad 85. Nose-like extensions 101 of the brake holder 63 engage between them the one-armed lever, and the cut-out 102 provides space for movement of the side sleeve 86 which pivots with the brake caliper.

The construction functions such that by increasing the active air pressure in the power source 96 or by decreasing the passive air pressure in the power source 97 the one-armed lever 91 presses the brake disc to the brake pad 85a, or through it to the brake caliper, via the intermediation of the automatic adjusting member 88 and the brake pad 85. The external force is transmitted to the brake holder 63 by the sleeve 69 and the shoulder ring 70. On the brake disc rotating with the wheel to be braked a frictional force $P_1$ arises under the influence of the normal clamping force which tries to rotate the brake caliper with a torque on the arm a in the direction opposite to the illustrated direction of rotation of the brake drum, about the bolt. As a consequence of the engagement of the involute profiles, the force $P_1$ exerts a turning moment on the brake shoe 71a about the moment arm $(2A - d/2)$ as a result of which, in the event of an angular displacement $\phi$ determined by the play $h$, the brake shoe abuts against the active inner mantle surface of the brake drum and exerts on it a circumferential frictional braking force generated by the force of engagement. Due to the construction the line of action of force $P_1$ remains independent of the wear of the friction lining, thus the braking effect remains constant. Owing to the internal transmission arrangement, the brake caliper rotates by an angle $\psi$ while the brake shoe rotates by an angle $\phi$. As a consequence of the expedient construction there is a small deviation between the centre of pivoting of the brake caliper and the axis line of the power source which is compensated by the permitted angular deviation of the forked end of the piston rod of the power source, to the extent determined by tangential movement c of the end of lever and the radiar movement coinciding with the length of the stroke of the arcuate movement of the lever arm. The centre of tangentially directed rotation of the one-armed lever is determined by the nose-like extensions 101 of the brake holder 63.

In FIG. 4 the stroke $l$ designates the maximum value of the total abrasion of the friction lining 84 and the surfaces of the brake disc 64, i.e. the condition wherein the adjusting member plays no role or where such a member is not used.

In the case where the adjusting member operates, the brake pad stroke is always $l_1$ which, related to the stroke of the piston spring of the power sources is only $l_2$, corresponding to the lever arm transmission. Accordingly the spacing of the twin power sources from the brake holder and its longitudinal dimensions in the direction of the stroke may be reduced and may even be constructed more favourably than shown.

When the sense of rotation of the brake drum changes (e.g. when reversing) the brake caliper also turns in the opposite direction around its bolt due to the frictional force, and thus the involute surfaces, which in normal operational condition engage each other, now move apart. Simultaneously, the automatic adjusting member 81 (which on compression becomes rigid) pivotally supported between the brake caliper and the brake shoe 71 (which is now a trailing shoe) transmits a force to the brake shoe 71 about the moment arm $b$ arising from the torque $(-P_1 \cdot d/2)$ and, after the brake shoe 71 has moved by an amount causing the disappearance of the clearance $h$, the shoe is pressed against the brake drum and generates braking friction which is then added to the frictional force of the disc brake of unchanged magnitude, providing sufficient braking effect for stopping a vehicle in a backward direction on a slope or for stopping it within the prescribed braking distance in reverse drive.

The automatic adjusting member 88 takes care of the adjustment of the disc brake and the friction linings engaging it, and the fact that the brake disc is not supported axially enables the compensation of wear on both sides to be provided by a single mechanism.

It is an advantage of this constructional embodiment that it permits the use of compressed air actuation and of a second actuation with stored spring force not only to exploit the advantageous effects of the combined brake system according to the invention, but at the same time also for the reduction in dimensions of the actuating devices themselves and also an improvement in the available choice of their location, arising from the fact that the arrangement forming the essence of the invention leads to only a small actuating force requirement because of the combination and because of the distribution. The other advantages of the constructional embodiment are the same as those of the embodiment of FIGS. 1 and 2.

I claim:

1. A braking device for motor vehicles, comprising a rotatable brake drum having an inner active surface, said drum being fixed to a part to be braked, a separate brake disc fixed to said part to be braked, a pair of brake calipers pivotally mounted on anchoring means diagonally fixed on the opposite sides of a support member, a pair of brakeshoes each having a pair of spaced inwardly extending webs, said shoes being mounted on said anchoring means, brake pads carried by said brake calipers, brake actuating devices for urging said brake pads against said brake disc, adjusting members automatically operated by the relative motion of the said brakeshoes and brake pads and interconnected thereto, said adjusting members elongating when pulled and transmitting forces when pushed without changing in length, springs urging said brakeshoes to retracted position, and in the said composite braking device tangential forces are transmitted to the said brakeshoes, arising from the friction generated on the active surfaces of the said brake pads when actuating the disc brake, the said forces driving the said shoes against the inner surface of the said brake drum, the brake pads and brakeshoes in one direction of rotation being in direct support against each other, while in the opposite direction of rotation due to the assistance by the automatic adjusting member it is a pressing association, said brake disc being positioned between the webs of the brakeshoes, the said brake pads together with their brake calipers being disposed in relation to the anchoring means of the brakeshoes operated by them, each on the opposite sides of a diagonal perpendicular to the straight line crossing the axes of the said anchoring means.

2. A braking device as claimed in claim 1, in which the brakeshoes and brake calipers form a one-piece means, said brake pads being supported against said brake calipers, said brake calipers forming a one-piece means with said brakeshoes with a gap causing a tangential backlash between said brake pads and said brakeshoes, said brake pads having in common said anchoring means with those said calipers containing said brake pads by means of said automatic adjusting members.

* * * * *